Patented Dec. 20, 1927.

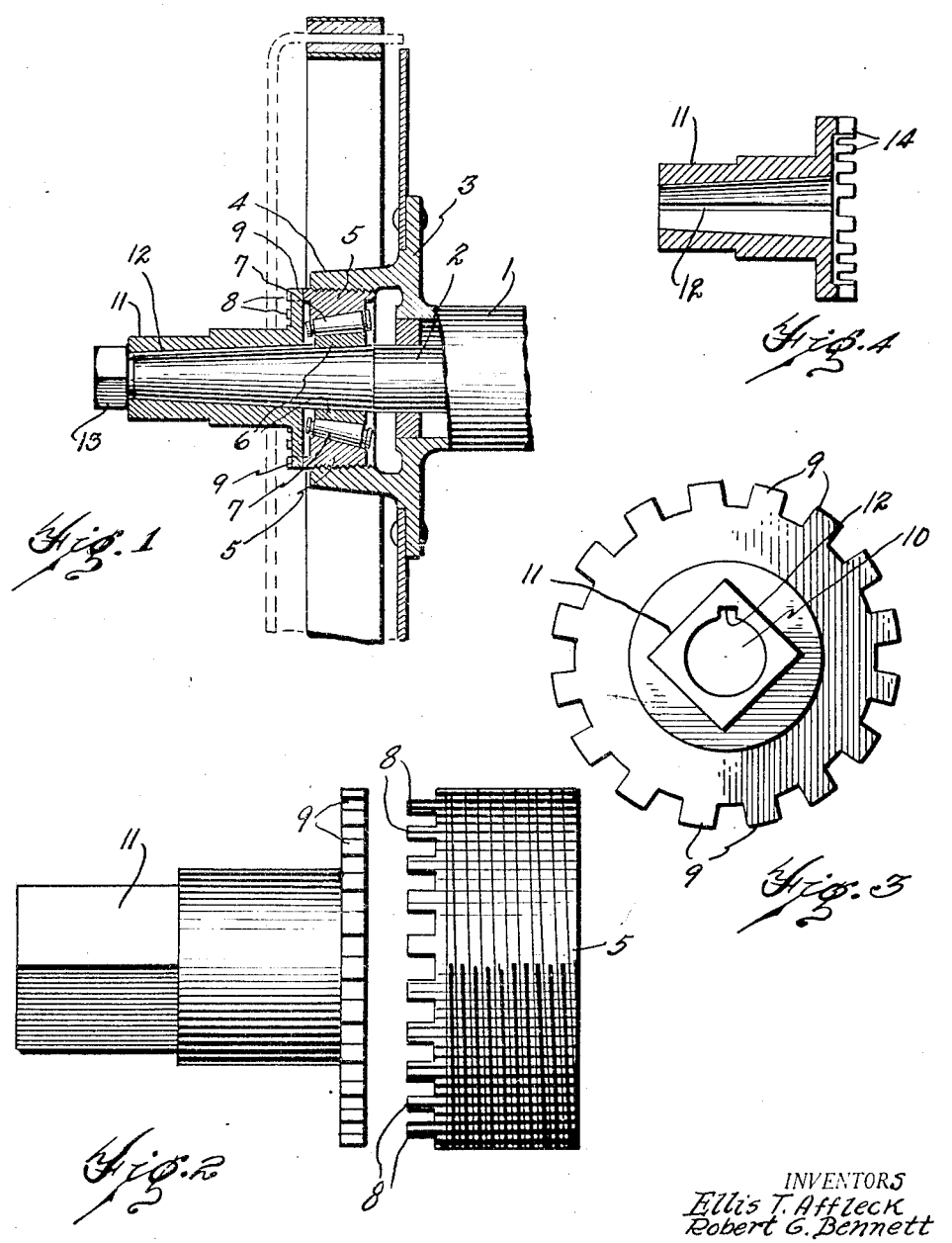

1,653,531

UNITED STATES PATENT OFFICE.

ELLIS T. AFFLECK AND ROBERT G. BENNETT, OF ESSEX, ONTARIO, CANADA; SAID BENNETT ASSIGNOR TO SAID AFFLECK.

BEARING-ADJUSTING-NUT WRENCH.

Application filed January 26, 1925. Serial No. 4,717.

This invention relates to bearing adjusting nut wrenches and the object of the invention is to provide a wrench for adjusting or removing the bearing adjusting nut for the rear wheels of automotive vehicles.

One of the principal objects of the invention is to provide a wrench by which the bearing adjusting nuts may be removed from rear axle, differential, and transmission housings even when rusted in place or expanded by constant wear so as to be impossible of removal except by an acetylene torch.

A further object of the invention is to provide a bearing adjusting nut wrench in which the power of the automobile engine may be applied to the wrench to remove a firmly embedded bearing adjusting nut.

Another object of the invention is to provide a bearing adjusting nut wrench which may be also turned by hand for adjusting the bearing or for removing bearing adjusting nuts which have not become fixed in the housing.

These objects and the several novel featurse of the invention are hereinafter more fully described and claimed, and the preferred form of construction by which these objects are attained is shown in the accompanying drawings, in which—

Fig. 1 is a section through a rear wheel bearing showing our improved wrench as applied thereto;

Fig. 2 is an enlarged elevation of the bearing adjusting nut wrench and bearing adjusting nut with which it is used;

Fig. 3 is an end view of the bearing adjusting nut wrench taken from the left of Fig. 2; and Fig. 4 is a section through an alternative type of bearing adjusting nut wrench.

As shown in Fig. 1 the usual rear axle of the automobile is provided with a stationary housing 1 in which the axle 2 is rotatably mounted. The housing 1 may be provided with a flange 3 for supporting the brake bands, and an internally threaded annular flange 4 is provided about the axle into which the bearing for the axle is threaded. The bearing comprises two parts, an outer bearing adjusting nut 5 and an inner annular portion 6 between which the roller bearings 7 are mounted. The bearing adjusting nut 5 is provided with a series of extending teeth or lugs 8, and the wrench is formed with a series of teeth or lugs 9 adapted to fit between the teeth 8 of the bearing adjusting nut 5, as will be understood from Figs. 1 and 2. The nut 5 and member 6 with the rollers 7 are slipped onto the tapered end of the axle 2, and the wrench which is provided with a tapered aperture 10 for the shaft is slipped over the tapered end of the shaft with the teeth 9 engaging in the teeth 8, at which time by application of a monkey wrench to the squared end 11, the bearing adjusting nut wrench may be turned to thread the bearing adjusting nut 5 into the member 4. By this arrangement the bearing may be adjusted in the flange 4 to properly support the axle or shaft 2. As the bearing becomes worn in use the wear may be taken up by means of the bearing adjusting nut wrench which may be utilized to thread the bearing farther into the flange 4.

If the bearing is not adjusted after a considerable period of wear it will allow play in the shaft 2, and the play of the shaft will sometimes pound the bearing adjusting nut and tend to expand it so that the bearing adjusting nut is so tightly seated in the flange 4 that it cannot be removed by manual power applied to the bearing adjusting nut wrench, and the inner edge of the adjusting nut 5 is sometimes flanged out in this manner so as to prevent removal of the bearing for replacement. The bearing adjusting nut 5 also occasionally becomes rusted in the flange 4 or broken and the usual procedure when the bearing has become rusted in place, expanded, or broken is to remove the bearing with an acetylene blow torch, which is a costly operation and liable to be injurious to other parts besides the bearing being removed.

With our improved bearing adjusting nut wrench, when a bearing adjusting nut of this type becomes fixed in the housing the key of the axle is fitted in the keyway 12 provided in the bearing wrench, and the nut 13 shown in Fig. 1 is drawn up to secure the wrench tightly to the shaft or axle 2 and cause the teeth 9 to engage in the teeth 8 of the bearing adjusting nut. At this time the opposite rear wheel and axle are secured from rotation and by means of the transmission, the low speed gear is connected to drive the propeller shaft of the automobile and the automobile clutch may be engaged to rotate the axle 2 which rotates the bearing adjusting nut wrench and by means of the teeth 8 and 9 rotates the bearing adjusting nut. As the opposite rear wheel and axle are held stationary the full power of the engine is applied to the bearing adjusting nut wrench and under this tremendous leverage the bearing adjusting nut is turned in the flange 4. It is important that the clutch be engaged only momentarily or in short quick jerks to loosen the bearing nut, and as soon as the bearing nut is loosened the nut 13 may be removed from the axle to allow the bearing nut to be unthreaded from the housing either by hand or by a wrench applied to the squared end 11 of the bearing wrench. If it is desired to remove the bearing nut entirely by motive power, the nut 13 may be turned up to force the bearing wrench to position, and then may be removed before the power is applied, at which time the unthreading of the bearing nut will merely back the bearing wrench off the axle. By connecting the reverse or forward speed gears of the transmission, the axle 2 and bearing nut wrench may be rotated in one direction or the other for either threading the bearing into the housing 1 or removing it from the axle housing, though the greatest utility of the bearing adjusting nut wrench when connected to the axle is for the removal of the broken mutilated or expanded bearing, because when the bearing has once been removed a new bearing may be easily mounted in the housing and adjusted by leverage applied to the bearing adjusting nut wrench by hand.

In some instances the bearing adjusting nut 5 is provided with teeth which are flanged outwardly instead of extending axially as shown in Fig. 2, and for this purpose the bearing adjusting nut wrench may be provided as shown in Fig. 4 with teeth or lugs 14 extending parallel with the axis of the axle for engaging the outwardly flanged teeth or lugs of the bearing adjusting nut.

When the bearing adjusting nut wrench is used on transmission adjusting nuts, the aperture 10 in the wrench, instead of being round as shown in Fig. 3, will be square to fit the square shafts of the transmission.

From the foregoing description it becomes evident that the device is very simple and efficient in operation, will not easily get out of order, provides a means for adjusting a bearing or for removing a bearing which has become fixed in a housing, and further provides a device which accomplishes the objects described.

Having thus fully described our invention, its utility and mode of operation, what we claim and desire to secure by Letters Patent of the United States is—

1. A bearing adjusting nut wrench for the removal of a bearing from a stationary housing into which the bearing adjusting nut is threaded and in which the bearing adjusting nut is provided with lugs extending from the housing and in which the shaft is provided with a key, comprising a body portion apertured to fit the shaft and having a keyway by which the wrench may be secured to the shaft, one end of the wrench being squared to which leverage may be manually applied to rotate the wrench, and the opposite end of the wrench being provided with a flange having lugs for engaging the lugs of the bearing adjusting nut.

2. A wrench for removing the notched adjusting nuts of bearings for axles of an automobile wheel in which there is a stationary housing for the bearing and in which the axle projects beyond the bearing and is provided with a key, comprising a body member longitudinally apertured to fit over the projecting end of the axle, lugs provided at the inner end thereof fitting the notches of the adjusting nut, said body having a keyway adapting it to be keyed to the axle and turned by rotation thereof relative to the stationary housing.

3. A wrench for the bearing retainer of the rear axle assembly of an automobile, said wrench comprising a tubular body adapted to fit on an end portion of the rear axle, said tubular body having spaced lugs on its inner end for engaging with the usual lugs on the outer end of the bearing retainer, said wrench body having internal means for engaging with the axle to prevent rotation of the wrench body on the axle and to permit axial movement of the wrench body on the axle.

4. A wrench for the bearing retainer of the rear axle assembly of an automobile, said wrench comprising a tubular body adapted to fit on an end portion of the rear axle, said tubular body having spaced lugs on its inner end for engaging with the usual lugs on the outer end of the bearing retainer, said wrench body having a longitudinally extending keyway in the inner wall of its outer end portion for engaging with the usual spline on the rear axle.

5. In a wrench for removing automobile axle housing nuts, a barrel constructed for disposition upon the end of the automobile axle in lieu of the usual wheel, means at the inner end of the barrel for positive engagement with the nut, and a key connection between the axle and said barrel, whereby when the axle is rotated the nut will be turned from the housing.

6. In a wrench for removing nuts from automobile axle housings, a barrel having a tapered bore extending longitudinally therethrough so as to permit the disposition of the barrel upon the tapered end of an automobile axle in lieu of the usual wheel, a key connection between the axle and the barrel, and means at the inner end of the barrel for positive engagement with the nut, whereby when the axle is rotated the nut will be threaded from the housing.

In testimony whereof we sign this specification.

ELLIS T. AFFLECK.
ROBERT G. BENNETT.